(No Model.)
F. W. WIESEBROCK.
PNEUMATIC GRAIN ELEVATOR AND PURIFIER.
No. 304,982. Patented Sept. 9, 1884.
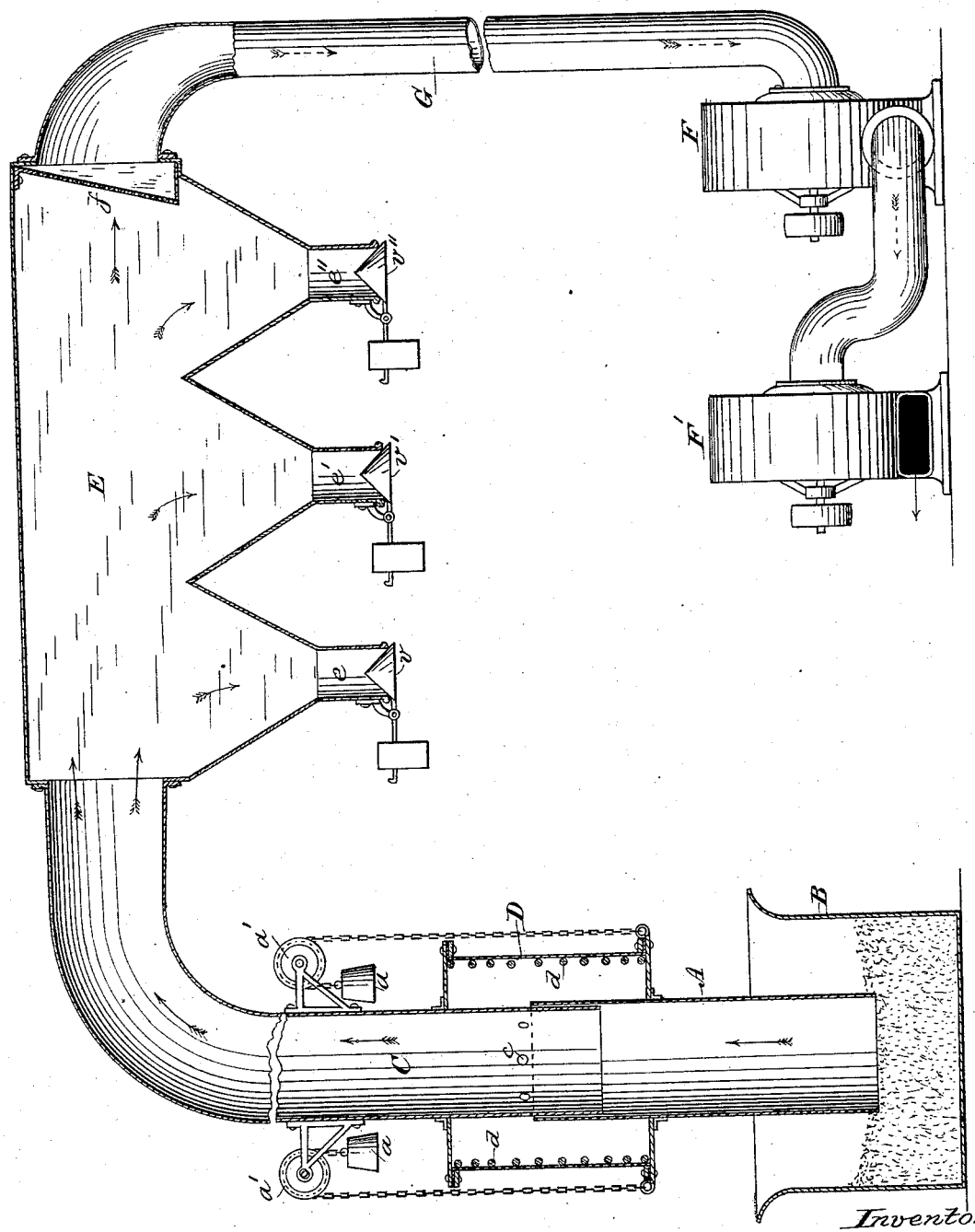
Witnesses:
Guy L. DeMotte
Alex Simon
Inventor:
Fred'k. W. Wiesebrock,
By T. C. Brecht,
Attorney.

United States Patent Office.

FREDERICK W. WIESEBROCK, OF NEW YORK, N. Y.

PNEUMATIC GRAIN ELEVATOR AND PURIFIER.

SPECIFICATION forming part of Letters Patent No. 304,982, dated September 9, 1884.

Application filed July 19, 1884. (No model.)

*To all whom it may concern:*

Be it known that I, FREDERICK W. WIESEBROCK, a citizen of the United States, residing at New York city, in the county of New York and State of New York, have invented certain new and useful Improvements in Pneumatic Grain Elevators and Purifiers; and I do hereby declare the following to be a full, clear, and exact description of the invention, such as will enable others skilled in the art to which it appertains to make and use the same.

My invention relates to improvements in pneumatic elevators and purifiers or separators for grain and other materials. The object is to produce an apparatus by which grain or other material can be elevated and separated or purified in an expeditious and economical manner at a uniform rate of speed, to prevent the slip of air by the wings of the blowers, and to make the apparatus automatic and self-regulating.

My invention consists in constructing the elevating or suction tube of a pneumatic elevator with a telescopic joint surrounded by a collapsible drum or cylinder, by which the entrance of the mouth of the tube into the material to be elevated is automatically regulated and the free action of the apparatus is permitted. Said tube communicates with an expansion-chamber provided with a series of hoppers or compartments, in which the grain, &c., is separated according to gravity, and the impurities or dust is carried off. The expansion-chamber is connected by a pipe to two or more exhaust-fans or blowers, each one of which communicates with the next one in succession, by which the slip of air passing the wings of the blowers is obviated or reduced to a minimum, and the pressure is made more regular and steady, as also greatly increased.

It further consists in the construction of certain details and arrangement of parts, as will be more fully described hereinafter, and more specifically pointed out in the claims, reference being had to the accompanying drawing, in which—

The figure represents a longitudinal vertical section of my improved apparatus.

In said drawing, A represents a tube or pipe of suitable dimensions and material, whose mouth extends into the grain or other material contained in a receptacle, B. Into said pipe A a second tube or pipe, C, projects, so as to form a telescopic joint. This is surrounded by a collapsible chamber or drum, D, consisting of an upper and lower head secured to the pipes A and C, and connected together by a flexible cylinder, which is held in an extended position by means of a series of hoops or rings, $d$. It will be readily seen that during operation, if the mouth of the pipe A becomes inserted too deep into the grain or other material the air in the chamber D will be drawn out by short tubes or holes $c$ in the pipe C, and suitable blowers, F, hereinafter referred to. When a partial vacuum has been created in said chamber, it will be compressed by the atmosphere, and thereby the mouth of the pipe A will be drawn out of the grain or other material to be elevated sufficiently to permit the free action of the apparatus. To facilitate the collapsing of the flexible chamber, counterweights $a$, attached to chains or ropes passing over pulleys $a'$, may be secured on the telescopic tube and lower end or head of the chamber. The tube C communicates at its upper end with an expansion-chamber, E. This chamber is of much greater area than the tube, so that the speed of the air is therein diminished, and the particles of grain, &c., not being held in suspension any more, will fall, according to their gravity, into a series of hoppers or compartments, $e\ e'\ e''$. The hoppers are provided with counterbalanced valves $v$, and when sufficient material has accumulated above them to overbalance the weighted valves they will open and allow the material to drop into suitable receptacles. The heaviest particles will drop into the foremost hopper, while the lightest will be carried to the last, and the dust and impurities will be drawn through a screen, $f$, and carried out through a pipe, G, which connects with the blowers F, the outlet of which communicates with the inlet of a second blower, F', and thereby the slip of air will be reduced to a minimum or obviated altogether, and the vacuum will be increased and its action much steadier than when only one blower is employed. If desired, any number of successive blowers may be thus connected with each other.

The chamber D can be made of any suitable flexible material, such as rubber, leather, canvas, &c.

The operation is as follows: The connections having all been properly made and everything placed in proper working order, the blowers are started and by their combined action a strong vacuum is created throughout the apparatus. The mouth of the pipe A being placed in contact with the grain or other material, the air will take up said material, carry it into the expansion-chamber, where the different particles will be separated, according to their gravity, while the dust, &c., will be carried off through the pipe and blowers. When sufficient material has accumulated in the hoppers to overbalance their counterbalanced valves, they will open and permit the material to drop into suitable receptacles.

Having thus described my invention, what I claim, and desire to secure by Letters Patent, is—

1. In a pneumatic elevator, a telescopic joint surrounded by a collapsible drum or chamber, substantially as and for the purpose specified.

2. In a pneumatic elevator, a telescopic joint surrounded or inclosed by a collapsible drum, provided with counterbalance-weights, substantially as and for the purpose set forth.

3. In a pneumatic elevator, the tubes A and C, forming a telescopic joint, surrounded by a collapsible drum, operated by vacuum and connected to an expansion-chamber, as and for the purpose described.

4. A series of blowers connected and communicating with each other and with an elevator-tube, arranged substantially as specified.

5. The combination of a telescopic elevator-tube having a collapsible drum, with an expansion-chamber and a series of blowers, arranged as and for the purpose set forth.

6. The combination of a telescopic elevator-tube, made automatically extensible by creating a vacuum in a surrounding drum, with a receptacle containing the material to be elevated, and blowers, substantially as specified.

7. The combination of a telescopic elevator-tube having a collapsible drum, and connected to an expansion-chamber provided with a series of hoppers, and two or more blowers, arranged substantially as set forth.

8. The pneumatic elevator herein described, consisting of a telescopic tube having a collapsible drum, and communicating with an expansion-chamber provided with hoppers or compartments and a screen over its outlet, and connected by a pipe with two or more blowers, in the manner and for the purpose described.

9. The method herein described of elevating and separating grain or other material, consisting in drawing it through a telescopic tube operating automatically, by means of a collapsible drum, into an expansion-chamber, separating it therein, and finally carrying off the refuse by a pipe connected to a series of blowers, all as specified.

In testimony whereof I hereby affix my signature in presence of two witnesses.

F. W. WIESEBROCK.

Witnesses:
CHRISTIAN WORCH,
ALEXANDER SIMON.